(12) United States Patent
Doljack

(10) Patent No.: US 6,442,276 B1
(45) Date of Patent: Aug. 27, 2002

(54) VERIFICATION OF AUTHENTICITY OF GOODS BY USE OF RANDOM NUMBERS

(75) Inventor: Frank A. Doljack, Pleasanton, CA (US)

(73) Assignee: Assure Systems, Inc., Pleasanton, CA (US)

( * ) Notice: Subject to any disclaimer, the term of this patent is extended or adjusted under 35 U.S.C. 154(b) by 0 days.

(21) Appl. No.: 08/897,857

(22) Filed: Jul. 21, 1997

(51) Int. Cl.[7] .................. G06F 17/60; G09C 3/08; H04L 9/00; H04L 15/34
(52) U.S. Cl. .................. 380/51; 705/28; 713/179
(58) Field of Search .................. 380/51, 55, 23; 705/28, 57; 700/215, 214; 713/179; 235/385

(56) References Cited

U.S. PATENT DOCUMENTS

| | | |
|---|---|---|
| 3,833,795 A | 9/1974 | Shoshani et al. |
| 4,463,250 A | 7/1984 | McNeight et al. |
| 4,879,747 A | 11/1989 | Leighton et al. |
| 5,367,148 A | 11/1994 | Storch et al. |
| 5,422,954 A * | 6/1995 | Berson .................. 380/51 |
| 5,592,561 A | 1/1997 | Moore |
| 5,598,477 A | 1/1997 | Berson |
| 5,768,384 A * | 6/1998 | Berson .................. 380/23 |
| 5,818,021 A * | 10/1998 | Szewczykowski .......... 235/380 |
| 5,822,739 A | 10/1998 | Kara |
| 6,073,114 A * | 6/2000 | Perkins, III et al. .......... 705/28 |
| 6,105,004 A * | 8/2000 | Halperin et al. .............. 705/28 |

FOREIGN PATENT DOCUMENTS

| | | |
|---|---|---|
| EP | 266748 A2 | 5/1988 |
| EP | 360225 A2 | 3/1990 |
| EP | 782112 A2 | 7/1997 |
| WO | WO 84/03019 | 8/1984 |
| WO | WO 93/22745 | 11/1993 |
| WO | WO 98 03904 | 1/1998 |

OTHER PUBLICATIONS

Tygar, J.D. et al: "Cryptographic Postage Indicia", Lecture Notes in Computer Science, Springer Verlag, New York, NY, US. vol. 1179, Dec. 1996, pp. 378–391.
"Point Of Sale Transaction Logging Scheme. Apr. 1980." IBM Technical Disclosure Bulletin, vol. 22, No. 11, Apr. 1980, pp. 5046–5049, XP002084211, New York, US.
PCT International Search Report, PCT/US98/15070, 4 pp.
Menezes, Alfred J., Paul C van Oorschot, Scott A. Vanstone, Handbook of Applied Cryptography, 1997, p. 401.*

* cited by examiner

Primary Examiner—Gail Hayes
Assistant Examiner—Douglas Meislahn
(74) Attorney, Agent, or Firm—Renner, Otto, Boisselle & Sklar, LLP

(57) ABSTRACT

A method of verifying the authenticity of goods includes generating one or more random codes and storing the one or more random codes in a database. The goods are then marked with one of the generated random codes such that each of the goods contain their own unique random code. Upon field checking and inventory of marked goods and comparing the codes on the marked goods to codes within the database, the authenticity of goods may be verified. Also, a system for verifying the authenticity of goods includes a database containing a plurality of unique random codes and an indication whether each of the unique random codes has been read, and a code reader or scanner for reading the code affixed to a good. The system further includes a computer apparatus or other electrical mechanism for comparing a read code to the unique random codes contained within the database such that upon comparison the comparing means indicates whether the read code is valid and if valid, whether it has been read previously on another good, thereby indicating the good's authenticity.

68 Claims, 5 Drawing Sheets

| ENCRYPTED COMBINATION CODES | DECRYPTED CODE |
|---|---|
| O6JTWXQW855BD | OYEQUYOU |
| OGDQDX4WF3EVR | D1U56YOU |
| OH2FIW2EMK86Q | ONWPYYOU |
| 1OF1TJVJBEMXZ | CI1D3YOU |
| 1L3HDZ9EW36HZ | 1HU3RYOU |
| O2WO8WDHJEJLX | 4GP2MYOU |
| 2HOM2YBBZ7VKE | AWDSEYOU |
| O88XIB8A3CXLX | BWKPTYOU |

VERIFICATION OF AUTHENTICITY OF GOODS BY USE OF RANDOM NUMBERS

FIELD OF THE INVENTION

The invention generally relates to a system and method for the verification of authenticity of goods. More particularly, in several embodiments the invention relates to a system and method of authenticating goods, tracking goods and/or detecting a diversion of goods via use of a random code and a used code database, encryption and/or comparison techniques.

BACKGROUND OF THE INVENTION

Products which are mass produced are distributed to end users through sales and distribution channels. When the products have particular value associated with them, counterfeiters sometimes produce products which are copies of those produced by the original manufacturers. These counterfeit products are then introduced into the sales and distribution channels and end users become deceived regarding the source of the goods and/or their quality. Lost sales occur for the original manufacturer, and the end user may receive less value than what was expected. Name brand goods, certified products and copyrighted products are often the target of such counterfeiting activities.

To address the problem of counterfeiting, one prior art solution has been to attach a label containing an optical device which is difficult to reproduce, for example, a holographic image to the products to confirm their authenticity. The original manufacturer controls these labels and their content to prevent easy access to such labels by counterfeiters. Use of such an optical device is desirable in that the authentication procedure is relatively simple, for anyone may visually inspect the label and its presence indicates authenticity. Unfortunately, this approach suffers from the weakness that skilled counterfeiters, by extending substantial effort, can reproduce these labels. Once reproduction is achieved, the counterfeiter may easily introduce a multitude of counterfeit products within the sales and distribution channels. A second disadvantage to the optical device methodology is that the creation of the special labels is relatively expensive and therefore is only cost effective for certain classes of products.

In pre-paid service areas, the use of randomly generated numbers have been utilized to validate a user prior to accessing the pre-paid service. For example, pre-paid phone card access numbers generated by random numbers have been used for such purposes. The phone card number is input into a phone or other device to validate the user prior to registering a phone call. A second application involves the use of confirmation numbers as back-up identification for electronic ticketing air fares. The use of random numbers for access of such pre-paid services, however, is substantially different than the use of optical codes for authenticating mass produced goods. For example, in the pre-paid phone card application, each random number is held secret by the user of the service, therefore a theft of the phone card or its loss may allow someone to access the pre-paid service. In the electronic air fare ticketing application, neither secrecy nor duplication of the code is of great concern since the use of the random number is only for backup identification. Knowledge of the confirmation number by a third party is unlikely to cause any loss because a third party's attempt to board an airplane flight will conflict with the boarding by the valid party. Unlike the product authentication in which previously optical devices have been used, the pre-paid service using randomly generated numbers play no role in preventing or deterring large scale loss due to counterfeiting of mass-produced goods.

In another prior art method for authentication, an apparatus is used to measure a random characteristic of a card, tag or label. The random characteristic, or "fingerprint," is read by a special reading apparatus and converted to a code which is encrypted and printed on the tag or label. The encryption ties the label to the original manufacturer of the product and the code value in turn is tied to the particular label on which it is printed since that label has the "fingerprint." This method, although secure in authenticating single labels, introduces significant costs because the label must contain special technology for the development of the "fingerprint" and a special reader must be developed and used at the time of printing the label and when the label is subsequently field checked. These shortcomings introduce significant costs in attempting to authenticate mass produced goods. It is not necessary to prevent even single counterfeits, which this method does, since the manufacturer of mass produced goods is instead interested in deterring mass counterfeiting of his product.

Therefore there is a need in the art for a low cost, secure way of verifying the authenticity of mass produced goods. There is also a similar need to track goods and/or detect a diversion of goods.

SUMMARY OF THE INVENTION

In one aspect of the invention, a method of verifying the authenticity of goods includes generating one or more random codes and storing the one or more random codes in a database. The goods are marked with one of the generated random codes such that each of the goods contains its own unique random code. Upon field checking an inventory of marked goods and comparing the codes on the marked goods to codes within the database, the authenticity of goods may be verified. The field checking step may further include verifying whether the codes on the goods are valid random codes and checking whether the codes on the goods have already been used. An indication may then be provided if the random code is invalid or, if valid, it has already been used.

In another aspect of the invention, a system for verifying the authenticity of goods includes a database containing a plurality of unique random codes and an indication whether each of the unique random codes has been read, and a code reader or scanner for reading the code affixed to a good. This system further includes a comparing means for comparing a read code to the unique random codes contained within the database such that upon comparison the comparing means indicates whether the read code is valid and if valid, whether it has been read previously on another good, thereby indicating the good's authenticity.

The verification system further includes a computer for generating the plurality of unique random codes which includes a memory for containing each of the generated random codes. The computer, upon generating a random code, compares the code to a list of previously generated codes within the memory and eliminates any generated code that is a duplicate, thereby ensuring that each generated code is unique. The verification system also includes a printer, in electrical communication with the computer, for printing the generated random codes on a tag, label or directly upon the good to be marked. The printer is capable of printing either the generated code alone, or each generated code with its corresponding bar code equivalent to the tag, label or directly on the product to aid in the subsequent reading of the code. The system may further include a scanner for reading the printed codes.

In another aspect of the invention, a method of detecting diversion of goods from a desired channel or channels of distribution includes the generation of an encrypted code, wherein the code has a random portion and a non-random portion. The encryption of this code is effectuated by an encryption key wherein each encryption key is unique to a desired channel or channels of distribution. The encrypted codes are applied to goods such that each good has its own unique encrypted code. Subsequently, within the desired channel or channels of distribution, the various goods are inspected and it is verified whether the decryption key used on the code successfully reproduces the non-random portion which is uniquely dedicated for the desired channel or channels of distribution. Consequently, the method identifies whether a diversion of goods has occurred if the decryption key does not match that used on the inspected goods.

In yet another aspect of the invention, a method of verifying the authenticity of goods includes the steps of generating one or more codes each comprising a random portion and a non-random portion and encrypting each such code to thereby generate a plurality of encrypted codes. The encrypted codes are marked on or affixed to the various goods such that each good has its own unique encrypted code. At a retail distribution site, for example, the encrypted code is decrypted and read from the various goods to identify its non-random portion. A match of the non-random portion to that used originally indicates a valid code while a mismatch indicates a counterfeit. If, after the comparison, the encrypted code is a valid code, the random code may be compared to a local or secure master database to determine whether the random code has already been used or is valid.

To the accomplishment of the foregoing and related ends, the invention comprises the features hereinafter fully described and particularly pointed out in the claims. The following description and the annexed drawings set forth in detail certain illustrative embodiments of the invention. These embodiments, however, are merely indicative of a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

The system and method of the following invention provides for the verification of authenticity of goods by use of random numbers. Random numbers, codes or encrypted combination codes including a random code and a non-random code are generated by a computer and subsequently produced on tags, labels or directly on products and ultimately placed within the stream of commerce. At a retail distribution outlet such as a retail store or alternatively, at any point earlier in the distribution chain, the codes are read from the marked products and compared to random codes contained within a database in which the codes are stored upon their initial generation. If the scanned product code is not verified as a valid code, the product is identified as a counterfeit. If the product code is a valid product code a further inquiry may be made to determine whether the valid code has previously been used. If the code has previously been used, the product is identified as a counterfeit; if not, an indication is made within the database that the valid code has now been used. Alternatively, the encrypted combination codes are decrypted and read to identify its non-random portion. If the decrypted non-random portion matches the originally used non-random code, goods are authenticated while a mismatch indicates a counterfeit. The present system and method allows for a cost-effective verification of authenticity of goods and provides a substantial deterrent to those who wish to counterfeit mass produced items.

Figure 1:
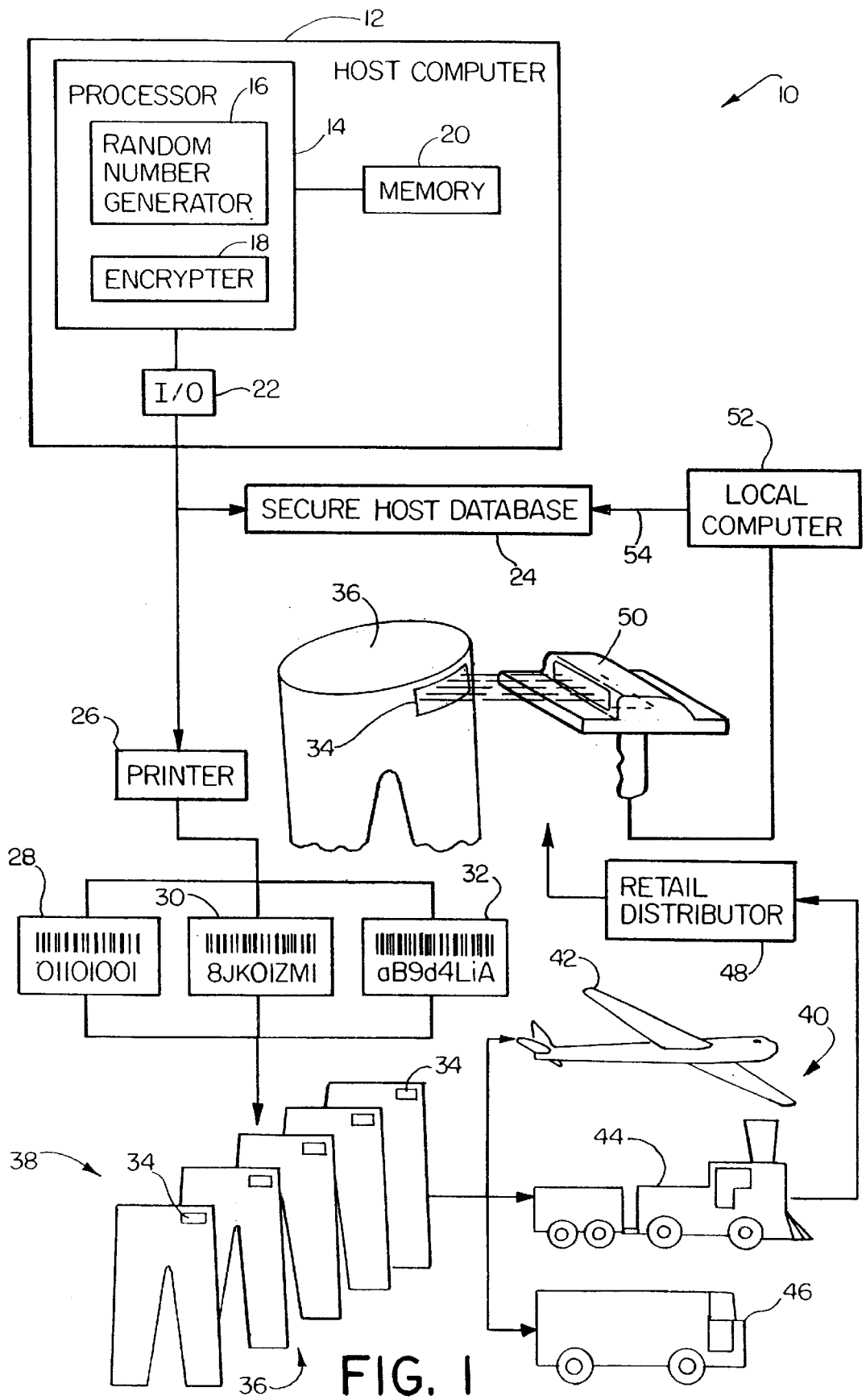
FIG. 1 is a system level diagram illustrating one embodiment of the invention, a system to generate and apply random codes to mass-produced goods and subsequently inspect the goods to verify their authenticity.

FIG. 1 is a combined system and method diagram which illustrates the various components of the present invention and provides an environmental context in which the various components are utilized; FIG. 1 therefore illustrates an authentication system 10. The authentication system 10 includes a host computer 12 having a processor 14 which contains the requisite hardware and software to provide a random number generator 16 and an encryptor 18. The processor 14 is coupled to an internal memory 20 for storage of generated random numbers or codes or alternatively for storage of various encryption algorithms to ensure that each code or encryption technique is unique. The processor 14 is also coupled to an I/O module 22 which provides input and output circuitry, drivers and interfaces to communicate with external components such as keyboards, printers and other peripherals or networks. Although the memory 20 has been illustrated as an internal memory, it should also be understood that the host computer 12 may alternatively utilize and access external memory. Upon generation of each random code, the processor 12 stores the random codes in a secure host database 24 for later access by field checkers to verify product authenticity.

The host computer 12 is coupled to a printer 26 via the I/O module 22. The printer 26 receives random codes generated by the processor 14 within the host computer 12 via the I/O module 22 and is operable to print out the random codes on various print media, for example, tags, labels or directly on various products. Depending upon the type of random code or combination code created by the random code generator 16, the printer 26 may generate a binary code 28 having a corresponding bar code for ease of reading or scanning, an alphanumeric code 30 having a corresponding bar code or alternatively a case sensitive alphanumeric code 32 with its corresponding bar code. Alternatively, other type codes may also be used. Depending upon the type of product being marked, the printer 26 generates the codes on a tag or label 34 (or alternatively directly on a product) which is then attached or affixed to the products 36, which are exemplary illustrated as the plurality of pants (clothing) which constitute a product inventory 38. Each product 36 is therefore marked with the label or tag 34, wherein each product 36 contains a unique random or combination code generated within the host computer 12. The products 36 are then distributed in commerce via various modes of transportation 40, for example, by air 42, by rail 44 or by standard freight shipping 46 to ultimately arrive at a retail distributor (or outlet) 48.

At the retail outlet 48 the label or tag 34 affixed to the product 36 is read by a tag reader (or scanner) 50 which is electrically coupled to the retail outlet's local computer 52. The local retail computer 52 is also in electrical communication with the secure host database 24 via a network-type connection 54. Various methods may be implemented utilizing the authentication system of FIG. 1; for example, the system 10 may not only verify the authenticity of mass produced products, but may also be used to identify a diversion of such products into undesired channels of distribution.

Figure 2:
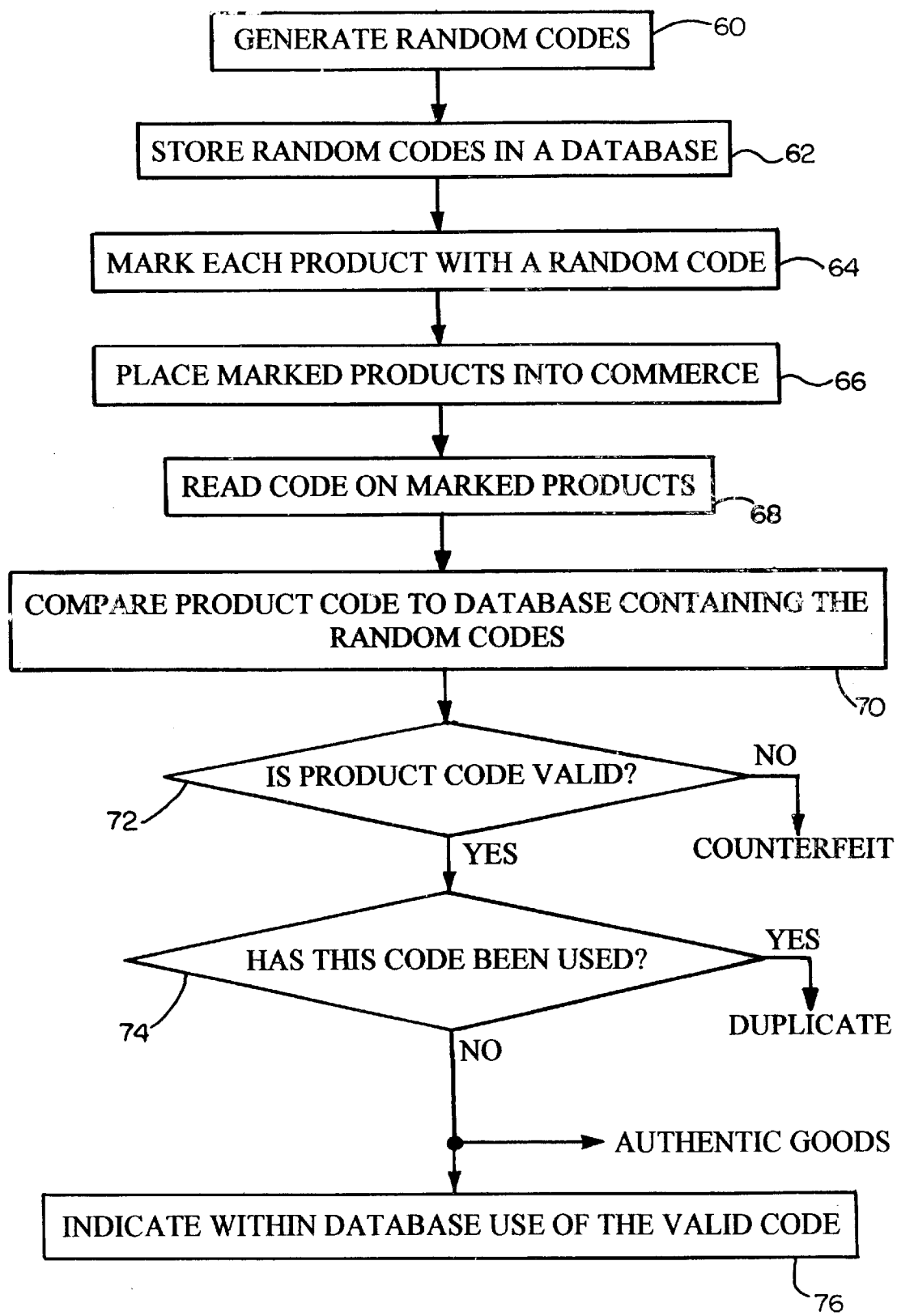
FIG. 2 is a block diagram illustrating another embodiment of the invention, using a random code applied to goods to authenticate their authenticity.

Turning now to FIG. 2, a method for verifying the authenticity of mass produced products via use of random codes utilizing the authentication system 10 of FIG. 1 will be described. At step 60, the authentication system 10 generates one or more random codes. The one or more random codes are preferably generated within the host computer 12 via a user requesting such generation via an input device such as a keyboard which is coupled to the I/O module 22 which, in turn, is coupled to the processor 14. Upon such request, the processor 14 initiates generation of such a code via the random number (code) generator 16. Upon generation, the processor 14 checks whether the generated random code has been previously generated by comparing the generated random code to previously generated codes resident within the memory 20. If the generated random code has previously been generated, the processor 14 will erase the random code and generate another. The processor 14 may look within the memory 20 for all previous products made, or alternatively, or look within various subdirectories within the memory 20 to see whether the generated random code has been previously generated for the specified product now being addressed. Otherwise, the generated code is determined to be unique. The generation of random numbers in software is well known by those skilled in the art. For example, see "Suggestions for Random Number Generation in Software" by Tim Matthews, An RSA Data Security Engineering Report, Revised Dec. 26, 1995, which is hereby incorporated by reference in its entirety.

Upon completion of the random code generation of step 60, the generated random codes are stored within the secure host database 24 at step 62. At this step, the host computer 12 has already verified that the random code is unique and sends the generated random code to the secure host database 24 via the I/O module 22. The secure host database 24 may be subsequently accessed to determine whether a valid random code read out in commerce has previously been used (which will be described in greater detail infra). After storage of the one or more random codes, each product is marked with one random code at step 64. The number of random codes required will be a function of the number of products 36 required to be marked. It is desirable that each product 36 have its own unique random code. Marking preferably is achieved by taking the generated random codes from the host computer 12 and printing them on a label 34 using the printer 26. As highlighted earlier, the random codes may be various types, for example, a binary 28, alphanumeric 30 or case sensitive alphanumeric code 32. Alternatively, other types of random codes may be utilized and fall within the scope of this invention. Upon placing a random code to each of the various labels 34, the labels 34 are affixed to the desired products 36.

Upon the completion of product marking, the marked products are placed into the flow of commerce at step 66 via any of the modes of transportation 40 which are highlighted in FIG. 1. Generally, such transportation constitutes standard freight shipping 46 such as by truck. The marked products 36 are then delivered to the retail outlet 48 where the marked products are read by a reading device or scanner 50 at step 68. Preferably, the label 34 on the product 36 is scanned by the scanner 50 upon the product's initial arrival at the retail outlet 48. Alternatively, the scanning may also be completed at a later time, for example, when the article is being purchased by a consumer. The scanner 50 scans the code on the tag 34, preferably by scanning the bar code which is a visual representation of the binary or alphanumeric random code being utilized. The scanner 50 takes the random code that has been scanned and downloads the scanned random code to the local computer 52.

The local computer 52 may be utilized for various accounting and inventory purposes in addition to the verification of authenticity of goods. In addition, the local computer 52 is in electrical communication with the secure host database 24 via either a wireless or wired network 54 or communication data link. The local computer 52, in accessing the secure host database 34, then compares the scanned random product code to those codes contained within the secure host database 24 at step 70 to verify whether the scanned random code is valid at step 72. If the scanned product code is not contained within the database 24 then the local computer 52 indicates to the individual performing the scan that the article is a counterfeit. Conversely, if the scanned product code is valid, that is, it has been found in the secure host database 24, the local computer 52 then checks the database 24 to see whether the scanned code has previously been used at step 74. If the database 24 indicates that the code has previously been used, the local computer 52 indicates to the user that the code is a duplicate. In this instance, one of two possibilities exist: either the present goods scanned are a counterfeit, or the product is authentic and the previously used code was attached to a counterfeit article. In either case, evidence of illegal counterfeiting activity has been uncovered. If the local computer 52, after analyzing the database 24, determines that the code has not previously been used, it indicates to the user that the goods are authentic and additionally indicates within the database 24 that a valid code has now been used at step 76. In this manner, the above method verifies the authenticity of mass produced products through use of random codes placed on the articles which are subsequently checked against a secure database whether the articles are at their retail outlet or perhaps at an intermediary wholesale location.

The effectiveness of the above-described method may be more fully appreciated through the following discussion of the method of FIG. 2. Suppose, for example, the type of random code chosen is a 64 bit binary code. The number of possible 64 bit binary codes is $2^{64}$, which is $1.8 \times 10^{19}$ different numbers. Further suppose that a manufacturer wishes to mark 100 million similar products to verify their authenticity. 100 million unique 64 bit codes are then randomly chosen, stored in the secure database 24, and then each unique random code is applied to each respective product in a form which is preferably removal-resistant and perhaps even tamper-evident. Because this application of a product marking to the product itself is normally done, no significant incremental cost is associated with this operation. Further, since 100 million mass produced products have been marked and $1.8 \times 10^{19}$ different codes are available, the probability of a counterfeiter guessing one of the used random codes is only 1 in $1.8 \times 10^{11}$. Therefore it is virtually impossible for a counterfeiter to come up with a significant number of valid codes without extending a considerable amount of effort and expense. For example, a counterfeiter must go to various retail outlets 48 and copy a number of valid random codes. This is an expensive and laborious process and further subjects the counterfeiter to potential discovery in the copying process. Additionally, whenever a counterfeiter applies a code which has been copied from products out in the field to his counterfeit products, the counterfeiter ends up labeling the product with a duplicate code. As already shown, all duplicates in the above method will be discovered which allows for subsequent investigation as to the source of the counterfeit product to identify the counterfeiter.

Even if the counterfeiter wishes to risk being identified by copying valid codes from the field, the counterfeiter must send someone into the retail outlets to copy valid codes from products already out in the stream of commerce. Suppose, for example, he extends considerable time and effort and gathers 1,000 valid codes. If he then produces one million counterfeit products he will use each of the 1,000 valid codes 1,000 times. He must then disguise his product by carefully mixing the marked items so that, once in the sales channel, field inspection is less likely to discover the duplicate at the same inspection site. This greatly complicates a counterfeiters logistics as well as his cost, thereby discouraging such counterfeiting activities. Furthermore, since multiple retail outlets will also access the database 24, even distributing the various codes to different outlets will still result in the duplicates being identified. Therefore, the care and effort taken by a counterfeiter to disguise his illegal acts only delays his discovery. Continued field checking will find the counterfeit products and will ultimately identify all the sales outlets which have or had the product. Therefore, it may be desirable for systematic field checking procedures to be put in place, for example, at the point of sale or at receipt of items at the retail outlet 48. In this manner, all counterfeit product will ultimately be intercepted and identified.

The randomly generated code may be, as in the previous example give, a 64 bit binary number. Alternatively, the random code may consist of, for example, an 8 bit alphanumeric code. These are the numbers 0 through 9 and the upper case and lower case alphabet A–Z and a–z, respectively. Since each bit of the 8 bit code can assume 62 different possibilities, there are $2 \times 10^{14}$ different codes possible. As in the previous example, there will only be a one in 2,182,400 chance of guessing a valid code for 100 million products. If one disregards the case sensitivity in the alphanumeric character set, this can drop to one in 28,211 chances, which is still unguessable for practical purposes. Other variations may also be used in creating the random generated code.

In the embodiment discussed with respect to FIG. 2, the authentication system 10 utilizes field checking and subsequent validation and verification of codes between the local computer 52 and the secure host database 24 via the network data link 54. Therefore in that discussion, it is evident that the database 24 interacts with the local computer 52 to the extent that codes which have been read in previous field checking are labeled as such and identified with the sales outlet in which they are found. So, when accessed from the retail outlet 48, the database 24 updates this information in addition to determining that the valid code is present in the database and is not a duplicate. In this manner, verification of product authenticity is made at the time of database access. However, this is not the only solution. Alternatively, such verification may be accomplished locally at the retail outlet 48 field check location without access to a secure master database.

Proceeding on to FIG. 3, a method of verifying the authenticity of products without accessing an off-site master database will be described in conjunction with the authentication system 10 of FIG. 1. At step 80, the generation of random codes is established in a manner similar to that described earlier in step 60 of FIG. 2; consequently, the details of such random code generation will not be repeated. At step 81, each random code is combined with a non-random code to thereby form a combination code. The non-random code may be, for example, the initials of the manufacturer, a tradename or other easily recognizable moniker or message, and combining may simply be accomplished by concatenating the initials to the end of each random code. Alternatively, the non-random code may be placed before or even interposed within the random code. Subsequent the generation of this combination code, the combination codes are encrypted at step 82 by the processor 14 within the host computer 12 which accomplishes the encryption via an internal encryptor 18. The encryptor 18, in a preferred embodiment, is a combination of processor hardware and software which allows for encryption of the generated combination codes which are developed from the random number generator 16 by concatenating each of its outputs with the non-random code. Preferably, the encryptor 18 uses an encryption key that is unique to each product manufacturer such that each manufacturer's products have their own unique encryption scheme. Preferably, the encryptor 18 uses an encryption scheme known as a public key cryptosystem. Such cryptosystems use two related keys, one for encryption and the other for decryption. One is kept private and the other is made public. After encryption, both the generated combination code (random number and its non-random portion) and its encrypted counterpart are both saved within the memory 20 for later comparison with subsequently generated random numbers to ensure that each generated random number and its encrypted counterpart are unique. After encryption, the encrypted combination code is generated via communication between the I/O module 22 and the printer 26. The printer 26 prints each encrypted combination code on a single tag so that each tag contains an encrypted combination code as well as its bar code representation. Therefore the code on each tag will consist of only an encrypted counterpart since the constant portion of the combination code is known. Again, as discussed earlier, these codes may be either a binary code 28, an alphanumeric code 30, a case sensitive alphanumeric code 32 as illustrated in FIG. 1 or any other type code.

At step 84, the tags containing the encrypted combination codes are placed on products such that each product contains its own unique encrypted combination code and each product is then placed in the stream of commerce at step 86. Upon reaching the retail distributer or outlet 48 the encrypted combination code is read at step 88 before the various products 36 are accessible to the regular consumers. The scanner 50 scans the encrypted combination code at step 88 and downloads it to the local computer 52 which contains a decryption key which is unique and provided by the manufacturer (the public key). The local computer 52 then decrypts the read encrypted code at step 90 and compares the decrypted code to the already known non-random code portion at step 92.

Figures 4, 5:
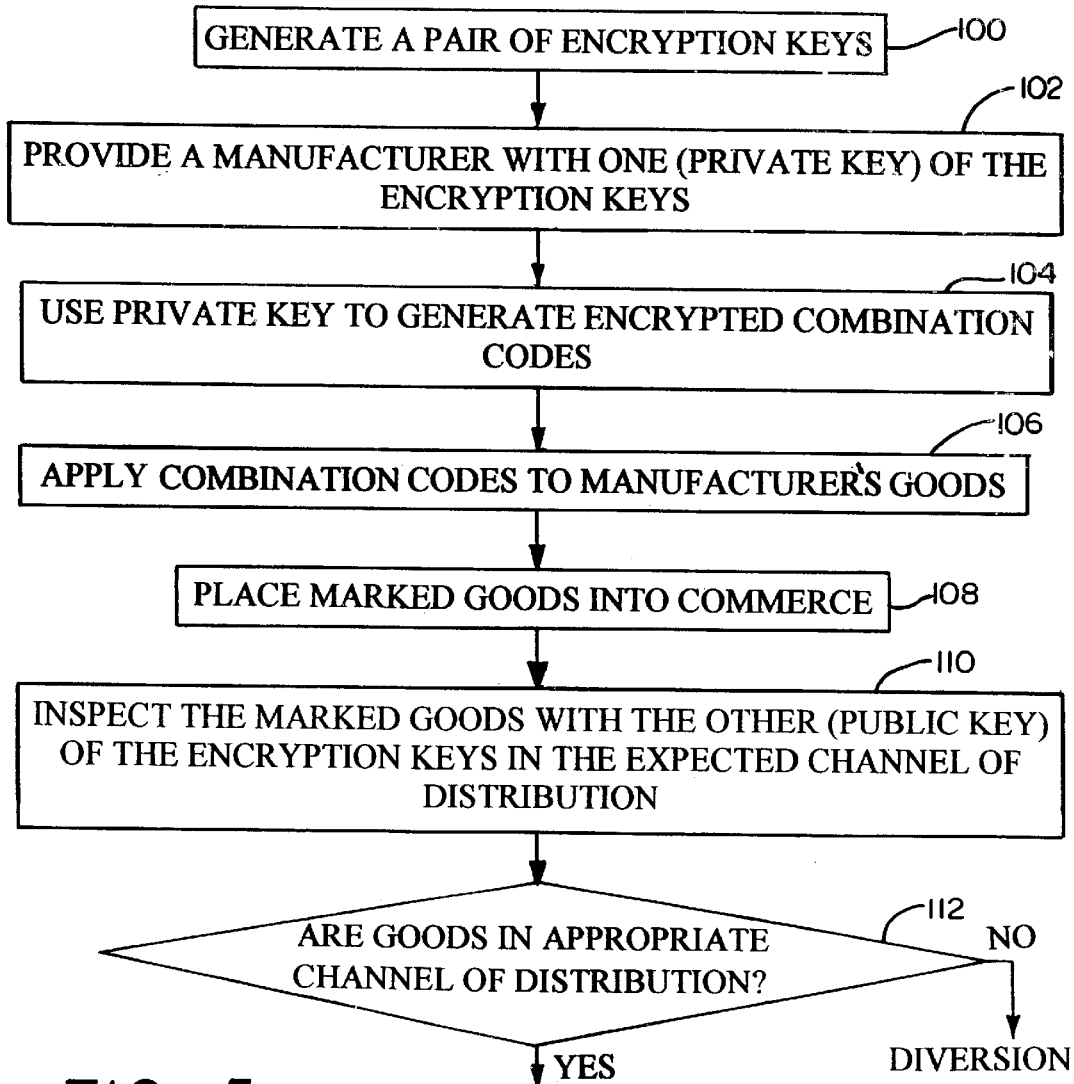
FIG. 4 is a chart illustrating the identification of a non-random portion of a decrypted combination code according to an embodiment of the present invention.
FIG. 5 is a block diagram illustrating another embodiment of the invention, using the authentication system to prevent the diversion of goods.

At step 94 the local computer 52 checks to see whether the already known non-random code portion and the decrypted code that had been read by the scanner 50 match. If the decrypted code and the non-random code portion do not match, the local computer provides an indication to the checker by either an audible or visual indicator that the product 36 is a counterfeit. The manner in which one recognizes the non-random portion of the combination code may be more easily understood in conjunction with FIG. 4. FIG. 4 is a chart 99 in which eight different encrypted combination codes have each been decrypted using a public encryption key. Note that each decrypted combination code has the same non-random code portion "YOU" at the end. Consequently, a checker can easily verify the authenticity since they know what the non-random code portion should be although the checker will not know the intricacies of the public key decryption methodology. As stated earlier, the non-random portion of the combination code may be a tradename, the manufacturer's initials, or any type of recognizable message. Alternatively, the local computer 52, after decryption, may display the decrypted code on a display portion of the scanner 50 so that the user scanning the tags can visually view the non-random code portion and thereby verify authenticity.

If a match is found, the local computer 52 checks to see whether this code has previously been scanned by the scanner 50 at step 96 by analyzing the random portion of the code which is unique for each combination code. If this code has previously been used at that locality, then the local computer 52 provides an indication that the product 36 is a counterfeit at step 96. Alternatively, a master database containing used codes may also be maintained in which various local computers 52 at various retail outlets 48 are connected together to indicate the identification of various valid codes so that the verification of whether a code has been used in step 96 may be even more extensive. Finally, at step 98, if the identified valid code has not been used the local computer 52 provides an indication to the user that the code is valid and therefore the goods are authentic and further provides an indication either within its own memory or within the master database that the code has been used for any subsequent checking.

Figure 3:
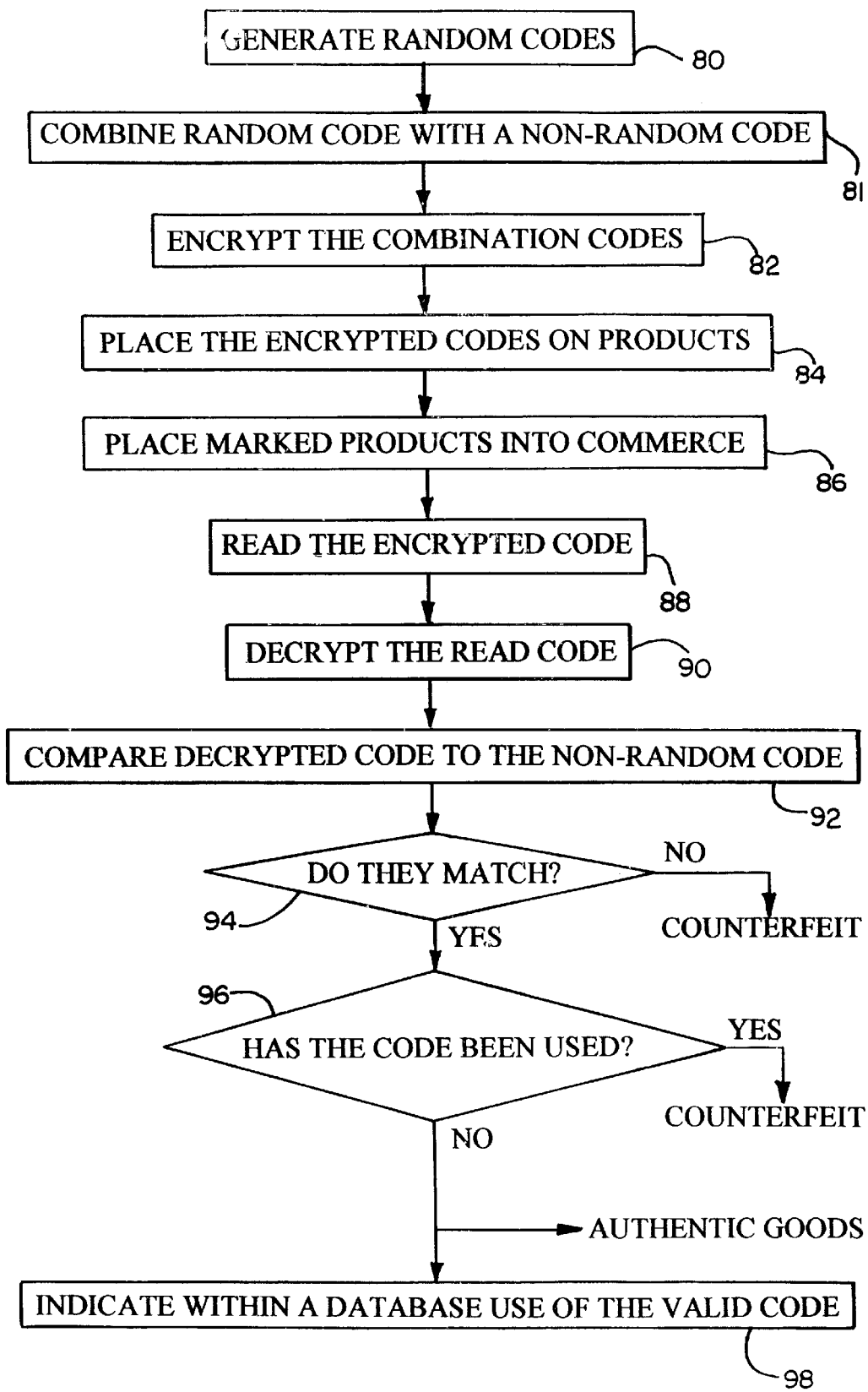
FIG. 3 is a block diagram illustrating yet another embodiment of the invention, using the system to generate encrypted codes for use in authenticating goods to thereby prevent counterfeiting.

In the above-described method of FIG. 3, a counterfeiter has few alternatives to try to defeat this method. The counterfeiter must create its own encryption method or encryption keys which will not match the encryption method or keys utilized to generate the encrypted combination codes in step 82 and therefore the decryption of the encrypted combination code will not match the already known non-random portion of the combination code in step 94 and a counterfeit will be detected. Further, if the counterfeiter chooses to copy codes after they become accessible to the public, these duplicate codes can be detected at step 96 since use of duplicate codes will be identified. Note also that a theft of the field checker's local computer 52 will not compromise the security provided by the host computer 12 since the local computer 52 contains a decryption key and a database listing of used codes. Recall that in a public key cryptosystem knowing the decryption key gives no knowledge of the encryption key. None of this information, therefore, is advantageous to the counterfeiter because it does not provide information regarding how to encrypt the codes nor does it indicate the existence of valid, presently unused codes.

The combination codes of FIGS. 3 and 4 provide an additional level of security by thwarting a counterfeiter who intercepts the field verifier (public key) and replaces them with his own verifier. If a counterfeiter steals the verifier and replaces it with one that includes the legitimate public key (obtained by analyzing the intercepted devices) and an additional bogus public key with control software, the counterfeiter will be able to inject counterfeit goods into the market that will appear valid via an analysis of the decrypted non-random code portion. However, as discussed earlier, the random code portions can be made virtually unguessable and the decrypted random code portions can be compared to a secure master database to see if the code is a valid random code that has not previously been used. Consequently, the combination provides another level of additional security, if desired.

Another alternative embodiment of the present invention relates to a method and system for identifying an undesired diversion of goods from a desired channel or channels of distribution and is illustrated in FIG. 5. The manner in which the method is performed will be discussed in conjunction with various components of the authentication system 10 of FIG. 1. At step 100, a pair of encryption keys (wherein the first, the private key, encrypts a code and the second, the public key, decrypts the encrypted code) are generated by the host computer 12. The encryptor 18 within the processor 16 generates the encryption key pairs, one key pair for each distribution channel through which the manufacturer intends to ship his goods.

After a unique pair of encryption keys are generated by the computer 12 at step 100, and wherein this unique pair of keys is associated with a particular channel of distribution through which goods are to be tracked, the private key is provided to the manufacturer of the goods at step 102 and used by the manufacturer to generate encrypted combination codes (step 104) as discussed earlier for application to the goods at step 106. The encrypted combination codes may be generated by a printer such as the printer 26 of FIG. 1 which is in electrical communication with a computer which dictates the combination code via the private encryption key. As discussed supra, the printer may apply the codes directly to the goods or alternatively may generate the codes on tags or labels for subsequent affixation to the goods. After the goods are properly marked, the goods are placed into commerce at step 108 into the particular channel of distribution via various modes of transportation (see, for example, FIG. 1, reference numerals 42, 44 and/or 46).

To determine whether a diversion of the goods into an undesired channel of distribution has occurred, an inspection of the goods within the expected channel of distribution is undertaken by the manufacturer at step 110. Inspection of the goods involves scanning the encrypted combination codes with a scanner 50 which is in electrical communication with a local computer such as computer 52 of FIG. 1 which contains the public encryption key which is associated with a particular distribution channel. At step 112, a determination is made whether or not the goods have been diverted by decrypting the encrypted combination code with the public encryption (decryption) key. If the decrypted code matches the already known non-random portion of the combination code no diversion has occurred, however, if no match is obtained, a diversion of goods from the desired channel of distribution has been discovered. Upon discovery, the manufacturer may then retrace the product shipments to identify the source of the diversion. To this end the manufacturer may use other public keys which are associated with other distribution channels to decrypt the encrypted combination code until he finds a match. In this way he can find the distribution channel into which the goods were first shipped.

Various modifications may be made to the above system and methods which also fall within the scope of this invention. For example, instead of utilizing an encryption technique on the combination codes, a digital signature of the random code may be generated by use of a one-way hash function and, in conjunction with a private key, used to calculate an encrypted number. This encrypted number along with the random number code forms a two-part code which is placed on the product. The manufacturer may now inspect this two-part code by decrypting the encrypted number with the public key to obtain the number. This number may then be compared with the number obtained by use of the one-way hash function with the random number code. If the numbers match, then the inspected product is determined to be authentic.

Figure 6:
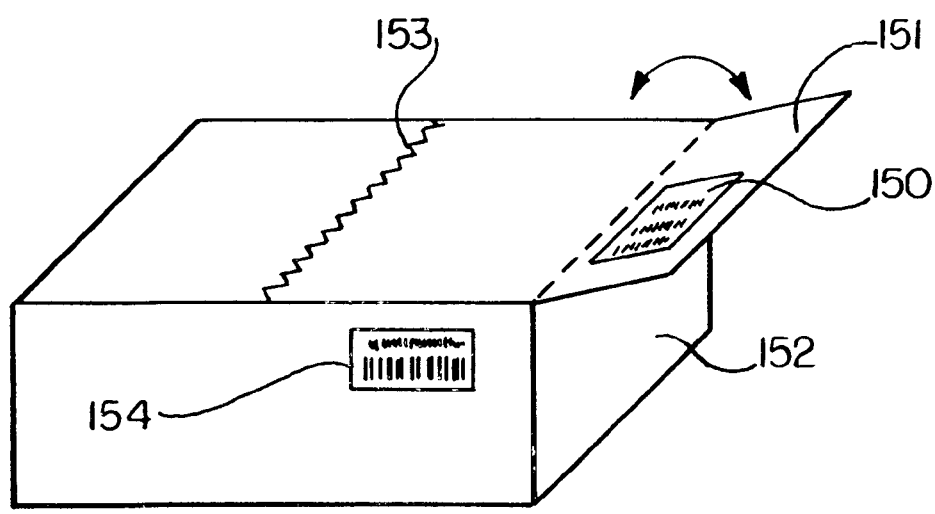
FIG. 6 is a perspective diagram illustrating goods having an encrypted combination code applied to an inside portion of a product wherein reading the code requires tampering with the product in an irreversible manner.

Another alternative is to place the random code or the encrypted combination code on the product in a location that is hidden from view such that the reading of the code can only occur by tampering with the product in an irreversible manner such that the code is tamper evident. A simple example is illustrated in FIG. 6, wherein a code 150 is affixed to an inside cover 151 of a sealed package 152. A seal 153 on the package 152 must be broken and the cover opened in order to read the code 150. Further, such reading may lower or destroy the value of the product whose code is being read. In this manner, a counterfeiter who attempts to gather valid codes from the goods within the distribution channel has an expensive task since great economic expense is incurred when attempting to copy a meaningfully large number of valid codes. Further, a manufacturer's need to check codes on products within the distribution channel in order to statistically determine a lack of duplicity is dramatically reduced. A counterfeiter will gather fewer codes as a result of the above-described added expense and it follows that his goods will have a proportionately higher number of duplicates. More duplicates makes any sampling program operated by the manufacturer more likely to find duplicates. Therefore, the manufacturer may choose to reduce his sampling program to save costs and still maintain high likelihood of discovering duplicates.

Figure 7:
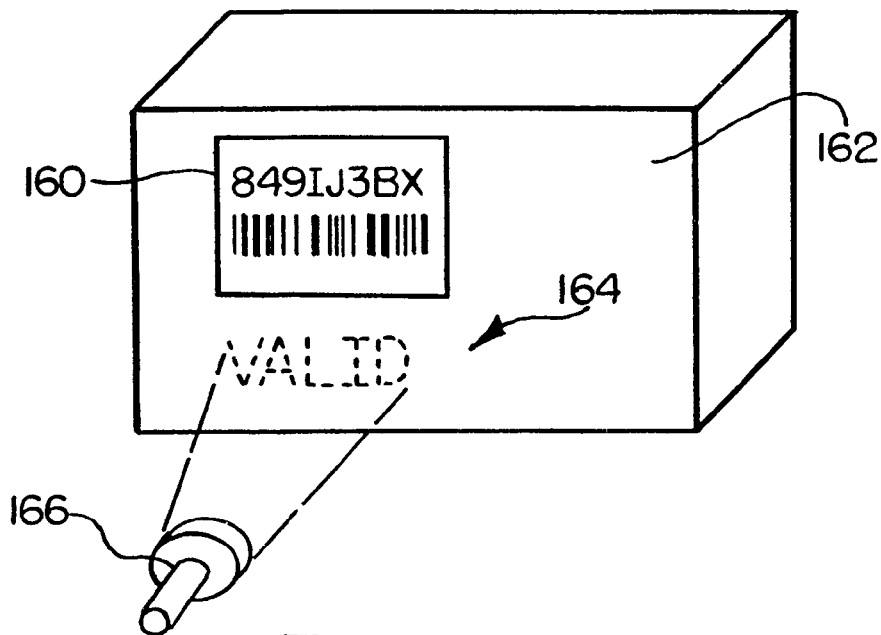
FIG. 7 is a perspective diagram illustrating a two part code, wherein one part is overt and the other is covert.

Yet another alternative embodiment is to create a two-part code such as that described in connection with the digital signature embodiment and apply the random number code overtly to the product and apply the encrypted number code covertly to the product. For example, as illustrated in FIG. 7, an encrypted code 160 may be placed on a package 162. The second code portion 164 is covert such that it is not easily detectable. Various covert type codes are contemplated. In this example, an invisible ink code is utilized which may be detected when irradiated with ultra-violet light from a UV source 166. Various other covert type coding techniques, however, are contemplated by the present invention. In another example, the encrypted code may be placed inside the package so that it is both time consuming and/or destructive (or defacing) to the product when attempting to observe it. In this manner, checking for whether the random code is a duplicate is easy since only the external code need be examined. Then, in order to check whether the goods are genuine, the manufacturer can sample a small percentage of the product. This technique makes it costly to gather a significant number of valid code pairs to mask counterfeiting activity.

The present invention is contemplated in the context of various types of mass produced goods. Although the above examples highlighted the invention in the context of consumer goods such as clothing apparel, etc. the invention is also applicable to other type goods. For example, the present invention may be incorporated with computer software in which the coding is placed on the packaging itself or alternatively may be placed on the storage media itself such as optical media in CD-ROMs or magnetic media such as diskettes, etc. In this context the scanner is replaced by the magnetic or optical head that reads the information on the disk and performs the encryption, etc. as highlighted above.

Although the invention has been shown and described with respect to certain embodiments, other alterations and modifications will occur to others skilled in the art upon the reading and understanding of this specification and the annexed drawings. In particular regard to the various functions performed by the above elements (components, assemblies, devices, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in exemplary embodiments illustrated herein. In addition, while a particular feature of the invention may have been described above with respect to only one of several illustrated embodiments, such feature may be combined with one or more other features of the other embodiments, as may be desired and advantageous for any given or particular application.

What is claimed is:

1. A method of verifying the authenticity of goods, comprising the steps of:

creating encrypted combination codes including (a) a respective random code unrelated to the goods and (b) a common, non-personalized to the goods, non-random code that is the same for a number of the combination codes for marking with respect to a number of goods;

marking one or more goods with one or more encrypted combination codes such that each of the one or more goods has its own unique random code and the same non-random code;

decrypting the encrypted combination codes on the one or more marked goods; and inspecting the decrypted combination codes (i) for presence of the non-random code without having to check a database for commonality thereof, and, if the non-random code is present, (ii) for uniqueness of the random code.

2. The method of claim 1, wherein the random codes are included in a subset of a total number of possible random codes and wherein the total number of possible random codes is larger than the subset.

3. The method of claim 1, wherein the step of marking one or more products comprises affixing a tag or label containing one random code to each of the one or more goods.

4. The method of claim 1, wherein the step of inspecting the inventory of marked goods comprises reading the one or more encrypted combination codes with a scanner.

5. The method of claim 1, wherein the step of inspecting the inventory of marked goods further comprises comparing random codes on the one or more goods to codes within a database to verify the authenticity of goods or identify counterfeit goods.

6. The method of claim 5, wherein the step of comparing the random codes to codes within the database further comprises the steps of:
   verifying whether the random codes on the one or more goods are valid random codes;
   checking whether the random codes on the one or more goods have already been used; and
   providing an indication of whether the goods are authentic or not.

7. The method of claim 6, wherein providing an indication of whether the goods are authentic comprises indicating whether the random codes on the one or more goods are valid and if valid, indicating whether the random codes have previously been used.

8. The method of claim 6, wherein the step of checking whether the random codes on the one or more goods has already been used further comprises the steps of:
   comparing a valid random code to a follow-up file containing other valid random codes which have already been used to determine whether the valid random code has been used; and
   updating the follow-up file with the valid random code if the valid random code has not been used.

9. The method of claim 1, wherein the non-random code initially is known at inspection step (i).

10. The method of claim 1, wherein the non-random code initially is identified at the inspecting step by inspecting at least two combination codes to find/discover two identical non-random code portions.

11. The method of claim 1, further comprising generating one or more random codes; and storing the one or more random codes in a database.

12. A system for verifying the authenticity of goods, comprising:
   a database containing a plurality of unique random codes and an indication whether each of the plurality of unique random codes has been read;
   a code reader for reading a code on a good, the code comprising an encrypted combination code which includes (a) random portion unrelated to the goods and (b) a common, non-personalized to the goods, non-random portion that is the same for a plurality of combination codes, wherein the non-random portion can be checked without having to check a database for commonality thereof and wherein a proper non-random portion of a read code is indicative of whether the read code is valid; and
   comparing means for comparing a read code to the plurality of unique random codes in the database, wherein the comparing means is operable to indicate whether the read code is valid and if valid, whether it has been read previously on another good.

13. The system of claim 12, further comprising a computer for generating the plurality of unique random codes.

14. The system of claim 13, wherein the computer further includes a memory for containing each of the generated random codes, and wherein the computer compares each generated random code to those within the memory and discarding any generated code that is a duplicate, thereby ensuring that each generated code is unique.

15. The system of claims 13, further comprising a printer electrically connected to the computer, wherein the printer is operable to print the plurality of unique random codes on a tag, label or directly on the good to be marked.

16. The system of claim 15, wherein the printer is operable to print each generated code and its corresponding bar code equivalent, to thereby aid in the subsequent reading of the code.

17. The system of claim 12, wherein the code reader is a scanner.

18. A method of determining whether an error in distribution of goods from a desired channel or channels of distribution has occurred, comprising the steps of:
   generating a combination code, including (a) a portion which is a random code unrelated to the goods and (b) a portion which is a common, non-personalized to the goods, non-random code that is the same for a number of combination codes and wherein the non-random code can be checked without having to check a database for commonality thereof;
   encrypting the combination code, wherein an encryption key used to perform the encryption of the combination code is unique to the desired channel or channels of distribution;
   applying the encrypted combination code to the goods; and
   verifying whether an encryption key used for encrypting the combination codes on the goods within the desired channel or channels of distribution matches the encryption key which is unique to the desired channel or channels of distribution, thereby identifying whether an error in distribution of goods has occurred.

19. The method of claim 18, wherein the error in distribution is a diversion of goods.

20. The method of claim 18, wherein the step of verifying further comprises:
   inspecting the goods within the desired channel or channels of distribution;
   decrypting the codes on the goods with a decryption key; and
   examining the decrypted codes, thereby determining whether a diversion of goods has occurred.

21. The method of claim 20, wherein examining the decrypted codes comprises comparing the decrypted codes to the non-random portion of the combination codes, wherein a match indicates no diversion of goods.

22. The method of claim 20, wherein the step of inspecting the goods comprises reading the codes on the goods with a scanner.

23. The method of claim 20, wherein the step of examining the decrypted codes comprises visually examining the codes for the expected non-random portion of the combination codes.

24. The method of claim 18, further comprising the step generating a pair of encryption keys, wherein one key is used to encrypt combination codes and the other is used to decrypt the codes within the desired channel or channels of distribution.

25. The method of claim 24, further comprising the step of providing a manufacturer with the encryption key to encrypt combination codes.

26. The method of claim 24, further comprising if an encrypted combination code cannot be decrypted by an encryption key used to decrypt the codes within the desired channel or channels of distribution, attempt decryption of the encrypted combination code by an encryption key used to decrypt the codes within a different channel or channels of distribution to search for the distribution channel into which the goods were earlier shipped.

27. The method of claim 18, wherein the step of generating one or more combination codes comprises the steps of:

generating one or more random codes; and combining the one or more random codes with a non-random code, said combining comprising combining plural respective random codes with the same non-random code to form plural respective combination codes.

28. The method of claim 16 further comprising the step of placing the goods into commerce after the encrypted combination codes have been applied to the goods.

29. The method of claim 18, wherein the error in distribution is a diversion of goods, wherein the combination codes are encrypted using a private encryption key, and the verifying comprises using a public decryption key for the desired channel or channels of distribution, and wherein if the desired channel or channels of distribution cannot be verified using the public decryption key, then further comprising using a further public decryption key designated for a different channel or channels of distribution to discover the incorrect channel or channels of distribution.

30. A method of verifying the authenticity of goods, comprising the steps of:

generating one or more combination codes having (a) a random portion unrelated to the goods and (b) a common, non-personalized to the goods, non-random portion that is the same for a number of combination codes and wherein the non-random portion can be checked without having to check a database for community thereof;

encrypting the one or more combination codes;

applying the encrypted combination codes to one or more goods, wherein each of the goods has a unique encrypted combination code; and examining goods to verify whether they are authentic.

31. The method of claim 30, wherein the step of generating one or more combination codes comprises the steps of:

generating one or more random codes; and combining the one or more random codes with a non-random code.

32. The method of claim 31, said combining comprising combining plural respective random codes with the same non-random code to form plural respective combination codes.

33. The method of claim 31, wherein combining the one or more random codes with a non-random code is selected from the group consisting of concatenating the non-random code to an end of the random code, concatenating the non-random code to a beginning of the random code and interposing the non-random code within the random code.

34. The method of claim 30, said generating comprising generating such plural combination codes having the same non-random portion and having different random portions.

35. The method of claim 34, said encrypting comprising encrypting such plural combination codes having the same non-random portion and different random portion as unique codes.

36. The method of claim 30, said applying comprising applying the encrypted combination codes as alphanumeric codes.

37. The method of claim 30, wherein the step of examining goods further comprises the steps of:

decrypting a code on each of the goods; and determining whether the goods are authentic based on the decrypted code.

38. The method of claim 30, wherein the step of examining the goods comprises the steps of:

reading a code from one of the one or more goods;

decrypting the code; and determining whether the decrypted code contains the non-random portion of the combination codes.

39. The method of claim 38, wherein the step of reading the code comprises scanning the code.

40. The method of claim 38, wherein the step of determining whether the decrypted code contains the non-random portion comprises visually inspecting the decrypted code.

41. The method of claim 30, wherein the step of examining the goods comprises:

reading a code from one of the one or more goods;

decrypting the code; and comparing the decrypted code to the non-random portion of the combination codes.

42. The method of claim 41, further comprising the step of determining whether the combination code has been previously used if the non-random portion matches a portion of the decrypted code.

43. The method of claim 30, said applying comprising applying the encrypted combination codes as bar codes.

44. A system for determining whether an error in distribution of goods from a desired channel or channels of distribution has occurred, comprising:

means for generating a combination code including (a) a portion which is a random code unrelated to the goods and (b) a portion which is a non-random code that is non-personalized to the goods and is the same for a plurality of combination codes and wherein the non-random code can be checked without having to check a database for sameness thereof;

means for encrypting the combination code using an encryption key which is unique to the desired channel or channels of distribution;

means for applying respective encrypted combination codes to the goods intended for the desired channel or channels of distribution; and means for verifying whether an encryption key used for encrypting the combination codes on the goods within the desired channel or channels of distribution matches the encryption key which is unique to the desired channel or channels of distribution, thereby identifying whether an error in distribution of goods has occurred.

45. A method of authenticating, comprising composing a plurality of combination codes, each including (a) a unique random portion unrelated to the item that is to be authenticated and (b) a non-personalized to the item that is to be authenticated, non-random portion, and wherein the non-random portion is the same for a plurality of the combination codes and wherein the non-random portion can be checked without having to check a database for sameness thereof, encrypting the combination codes, identifying respective encrypted combination codes with respective items, decrypting the encrypted combination code of a respective item; and checking the decrypted combination code to determine whether the non-random portion is correct.

46. The method of claim 45, said checking comprising viewing the non-random portion of the decrypted combination code to determine whether it is the same as the non-random portion used to compose the combination code.

47. The method of claim 45, if at the checking step the non-random portion is correct, the method further comprising further checking the decrypted combination code to determine whether the random portion of the decrypted combination code is unique.

48. The method of claim 47, further comprising storing in a database or the like the random portions of respective combination codes and an indication of whether such random portion already has been encountered as part of an encrypted combination code identified with a respective item.

49. The method of claim 48, said further checking comprising determining whether the random portion of a decrypted combination code has already been encountered, thus indicating non-uniqueness of such random portion.

50. The method of claim 49, if the random portion of a decrypted combination code is non-unique, indicating a possible counterfeit.

51. A method of identifying items, comprising
associating with respective items respective encrypted combination codes each composed of (a) respective unique random portion unrelated to the goods and (b) a non-personalized to the goods, non-random portion, and wherein the non-random portion is the same for a plurality of the combination codes and wherein the non-random portion can be checked without having to check a database for sameness thereof.

52. The method of claim 51, said associating comprising applying the respective combination codes to respective items or labels associated with the items.

53. The method of claim 52, said applying comprising applying a bar code.

54. The method of claim 52, said applying comprising applying alphanumerics.

55. A method of preparing authenticating indicia for items, comprising
composing a plurality of combination codes, each including (a) a respective unique random portion unrelated to the items and (b) a non-personalized to the respective items, non-random portion, and wherein the non-random portion is the same for a plurality of the combination codes, and wherein the non-random portion can be checked without having to check a database for sameness thereof, and
encrypting the combination codes.

56. The method of claim 55, further comprising selecting the non-random portion as at least one of a readable word, number or alphanumeric.

57. A method of checking authentication of an item identified by a respective encrypted combination code of a plurality of encrypted combination codes, each combination code including (a) a unique random portion and (b) a non-random portion, and wherein the non-random portion is the same for a plurality of the combination codes and is not personalized to the items to be identified and wherein the non-random portion can be checked without having to check a database for sameness thereof, comprising
checking the decrypted combination code to determine whether the non-random portion is correct.

58. The method of claim 57, said checking comprising viewing the non-random portion of the decrypted combination code to determine whether it is the same as the non-random portion used to compose the combination code.

59. The method of claim 57, if at the checking step the non-random portion is correct, the method further comprising further checking the decrypted combination code to determine whether the random portion of the decrypted combination code is unique.

60. The method of claim 59, further comprising storing in a database or the like the random portions of respective combination codes and an indication of whether such random portion already has been encountered as part of an encrypted combination code identified with a respective item, said further checking comprising determining whether the random portion of a decrypted combination code has already been encountered, thus indicating non-uniqueness of such random portion.

61. A method of verifying the authenticity of goods, comprising
inspecting an inventory of goods, which are marked with one or more encrypted combination codes, each of which codes includes (a) a respective random code unrelated to the goods and (b) a common, non-personalized to the goods, non-random code that is the same for a number of combination codes, for presence of the non-random code without having to check a database for commonality thereof.

62. The method of claim 61, further comprising inspecting the inventory of marked goods for uniqueness of the random code.

63. The method of claim 62, said inspecting for uniqueness of the random code comprises checking whether the random code appears in a database of encountered random codes.

64. The method of claim 63, said checking whether the random code appears in a database of encountered random codes comprising checking a database of random codes in which the previously encountered random codes are designated.

65. The method of claim 63, said inspecting for uniqueness of the random code comprises checking whether the random code appears in a remotely located database of encountered random codes.

66. The method of claim 62, said inspecting for uniqueness of the random code comprises checking whether the random code has been previously encountered without having to check a remotely located database of encountered random codes.

67. The method of claim 61, wherein the combination codes are encrypted by a private key, and said inspecting comprises using a public key to decrypt the encrypted combination codes.

68. A system for verifying the authenticity of goods, comprising:
a code reader for reading a code on a good, the code comprising an encrypted combination code which includes (a) a random portion unrelated to the goods and (b) a common, non-personalized to the goods, non-random portion that is the same for a plurality of combination codes, wherein a proper non-random portion of a read code is indicative of whether the read code is valid; wherein the non-random portion can be checked without having to check a database for commonality thereof; and
comparing means for comparing the random portion of a read code to unique random codes in a database, wherein the comparing means is operable to indicate whether the read code has been read previously on another good.

* * * * *